US011047357B2

(12) United States Patent
Leone et al.

(10) Patent No.: US 11,047,357 B2
(45) Date of Patent: Jun. 29, 2021

(54) METHODS AND SYSTEMS FOR DETERMINING ENGINE SPARK TIMING

(71) Applicant: Ford Global Technologies, LLC, Dearborn, MI (US)

(72) Inventors: Thomas G. Leone, Ypsilanti, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1464 days.

(21) Appl. No.: 14/038,555

(22) Filed: Sep. 26, 2013

(65) Prior Publication Data
US 2015/0083080 A1 Mar. 26, 2015

(51) Int. Cl.
*F02P 5/04* (2006.01)
*F02D 19/08* (2006.01)
*F02P 5/152* (2006.01)
*F02D 35/02* (2006.01)
*F02D 37/02* (2006.01)
*F02D 41/00* (2006.01)

(52) U.S. Cl.
CPC .............. *F02P 5/04* (2013.01); *F02D 19/081* (2013.01); *F02D 35/027* (2013.01); *F02D 37/02* (2013.01); *F02D 41/0025* (2013.01); *F02P 5/045* (2013.01); *F02P 5/1527* (2013.01); *F02D 2200/0612* (2013.01); *Y02T 10/30* (2013.01); *Y02T 10/40* (2013.01)

(58) Field of Classification Search
CPC .. F02D 35/027; F02D 41/0025; F02D 19/081; F02D 37/02; F02B 47/04; F02B 51/00; F02P 5/045; F02P 5/1527
See application file for complete search history.

(56) References Cited

U.S. PATENT DOCUMENTS

| 5,233,962 | A | * | 8/1993 | Fodale | F02P 5/1527 |
| | | | | | 123/406.3 |
| 5,633,798 | A | | 5/1997 | Kopp | |
| 5,845,620 | A | | 12/1998 | Miyashita et al. | |
| 6,827,062 | B2 | | 12/2004 | Fukusako et al. | |
| 2004/0035395 | A1 | * | 2/2004 | Heywood | F02B 1/12 |
| | | | | | 123/435 |
| 2005/0268886 | A1 | | 12/2005 | Etou et al. | |
| 2008/0060627 | A1 | * | 3/2008 | Bromberg | F02B 47/04 |
| | | | | | 123/575 |
| 2015/0159573 | A1 | * | 6/2015 | Glugla | F02D 41/1498 |
| | | | | | 701/103 |

OTHER PUBLICATIONS

Stein, Robert A. et al., "Effect of Heat of Vaporization, Chemical Octane, and Sensitivity on Knock Limit for Ethanol-Gasoline Blends," SAE Technical Paper Series 2012-01-1277, Int. J. Fuels Lubr. 5(2), Apr. 16, 2012, 21 pages.

* cited by examiner

*Primary Examiner* — Gonzalo Laguarda
(74) *Attorney, Agent, or Firm* — Geoffrey Brumbaugh; McCoy Russell LLP

(57) ABSTRACT

Systems and methods for providing spark to an engine are described. In one example, engine knock limited spark timing is expressed as a straight line that is determined in response to engine knock, spark timing, and engine load. The method and system described herein may be performed without extensive engine calibration and mapping.

15 Claims, 4 Drawing Sheets

METHODS AND SYSTEMS FOR DETERMINING ENGINE SPARK TIMING

FIELD

The present description relates to a system and method for determining spark timing for an internal combustion engine. The methods may be particularly useful for vehicles that may operate with more than one type of fuel and with different fuel blend ratios.

BACKGROUND AND SUMMARY

An internal combustion engine may be capable of operating with a plurality of different fuel types. Further, an internal combustion engine may operate with different blend ratios of different fuels. For example, an engine may be operated with gasoline at lower engine loads. The same engine may be operated using only ethanol or a ratio of gasoline and ethanol at higher engine loads. By operating the engine with different fuel types, it may be possible to improve engine fuel economy and performance as compared to operating the same engine with only one type of fuel.

Although engine fuel economy and emissions may be improved by operating an engine with a plurality of fuel types, operating the engine with varying ratios of fuels and different fuel types may make it more difficult to operate the engine. For example, if two fuels are combusted in an engine at the same time in ratios that vary with engine operating conditions, it may be difficult to determine open loop knock limited spark timing for the engine. If one of the two fuels has a higher octane rating than the other fuel, knock limited spark timing may be mapped for both the higher and lower octane fuels. However, when the fuels are combusted in the engine together and in different ratios, the known knock limited spark timing for the higher and lower octane fuels may be different than knock limited spark timing for combusting the ratio of high and low octane fuels. If the engine is operated with spark timing based on the higher or lower octane fuel while combusting a ratio of higher and lower octane fuels, the engine may knock or engine fuel economy may be degraded. Therefore, it would be desirable to determine knock limited spark timing for the ratio and types of fuels being combusted by the engine.

The inventors herein have recognized the above-mentioned disadvantages and have developed a method for adjusting engine spark timing, comprising: adjusting engine spark timing in response to an engine knock limited spark interpolated from a plurality of engine knock limited spark versus engine load relationships. In one example, engine knock limited spark timing may be expressed for different fuel blends and/or ratios of fuel supplied to an engine cylinder during a cylinder cycle as a plurality of straight lines that relate engine knock limited spark timing as a function of engine load.

By interpolating between lines that represent known engine knock limited spark timing as a function of engine load, it may be possible to provide the technical result of determining engine knock limited spark timing for fuel mixtures and blends at conditions where the engine has not been operated and mapped. Further, in some examples, the method may allow engine knock limited spark timing to be extrapolated to fuel fractions that have higher or lower ratios of different fuels than fuel blends that have been mapped.

The present description may provide several advantages. In particular, the approach may avoid over advanced or under advanced spark timing to improve engine efficiency and performance. Further, the approach may reduce the complexity of calibrating an engine controller. Further still, the approach may allow some engine spark timing to be learned by the engine controller instead of having to be calibrated during engine development.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 3:
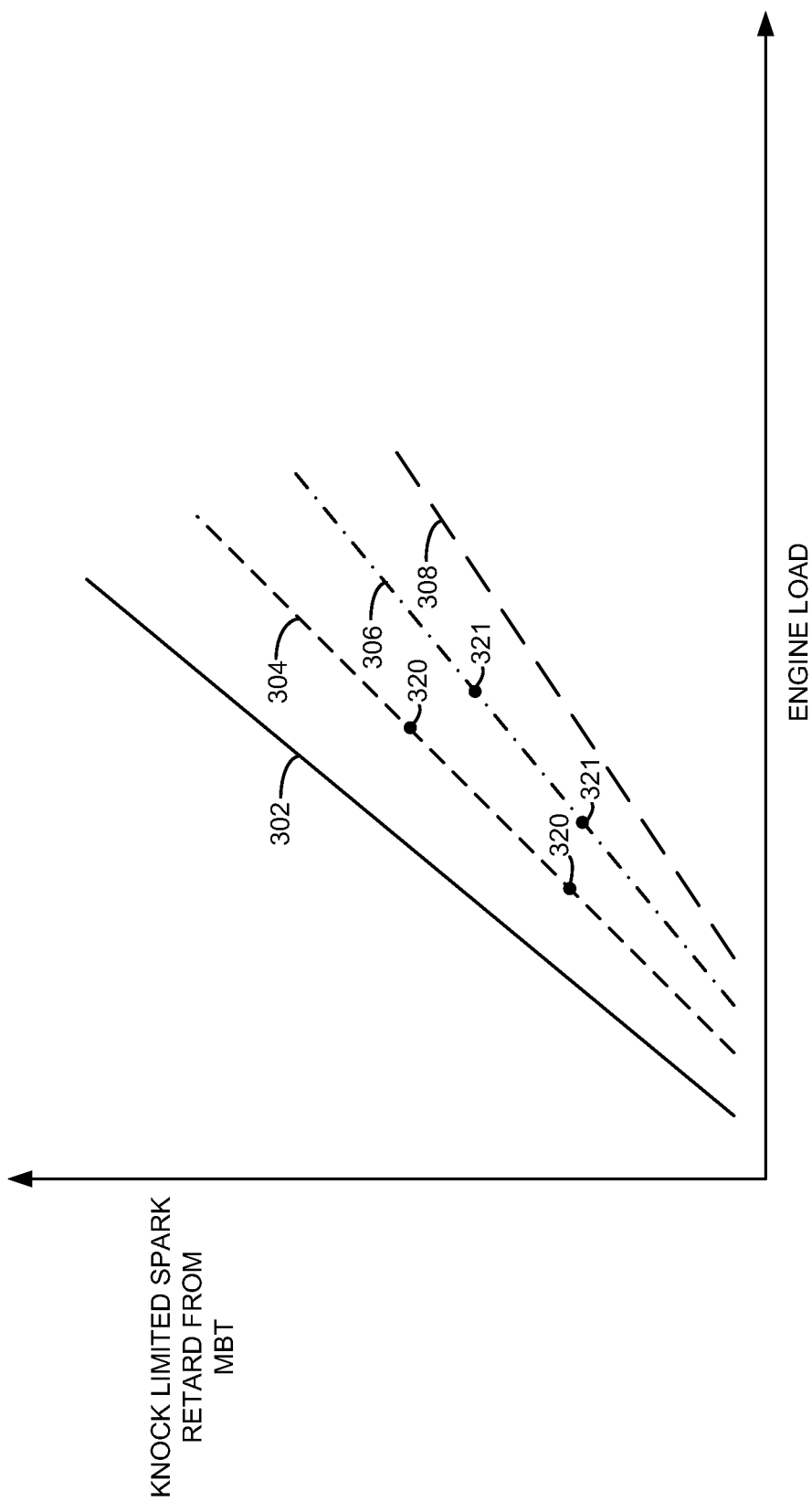
FIG. 3 shows a graphical example of extrapolating knock limited spark timing for higher and lower octane fuels based on knock limited spark timing of two different fuel blends.
Figure 4:
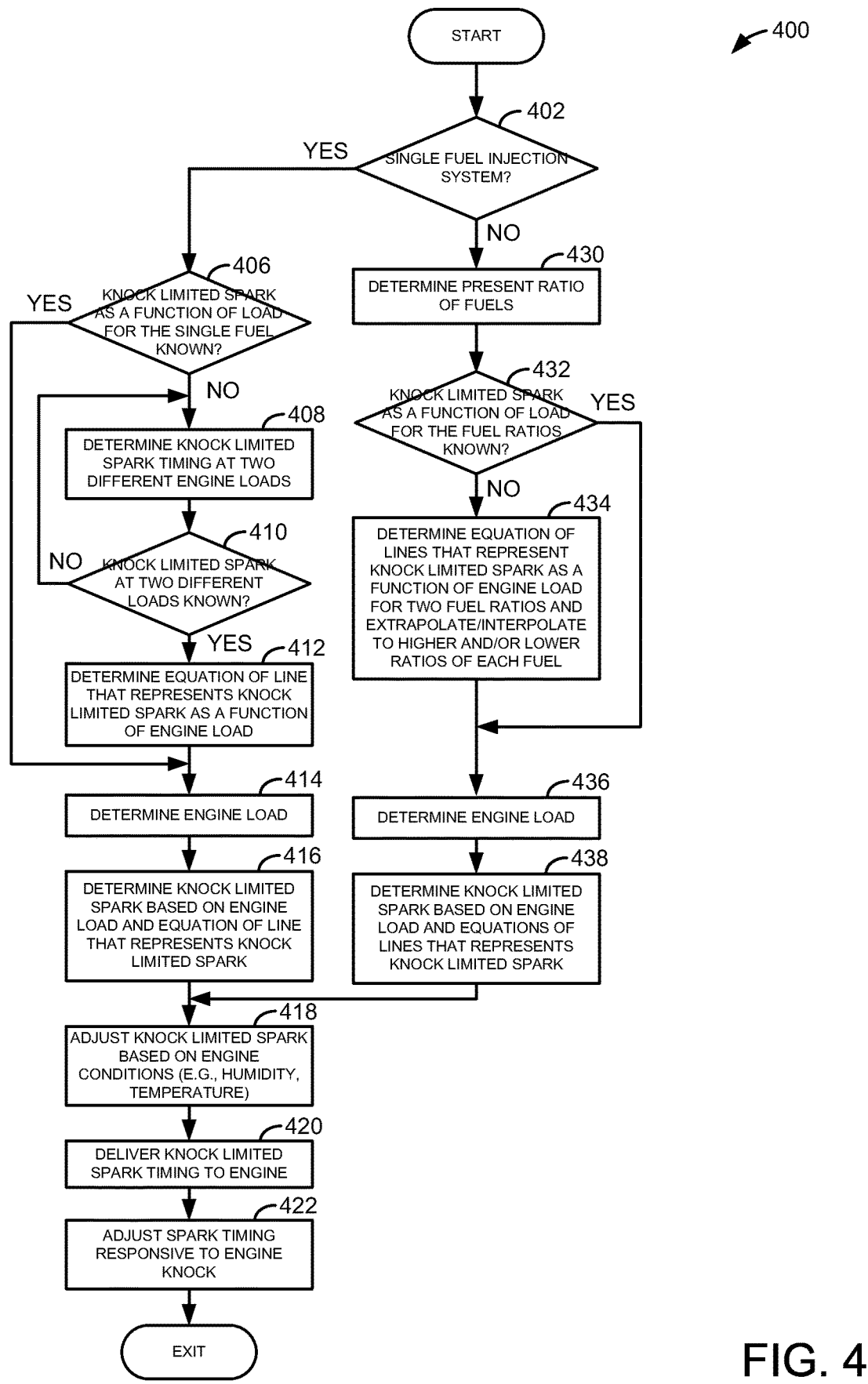
FIG. 4 shows a flowchart for a method for determining engine spark timing.

The present description is related to determining knock limited spark timing (e.g., spark timing at an engine speed and load where engine knock intensity is at a threshold level where additional spark advance may increase engine knock intensity, which may result in engine degradation) for an engine. The engine may be a type of engine described in FIG. 1. Knock limited spark timing for a combusted blended fuel mixture may be interpolated based on knock limited spark timing of a higher octane fuel and a lower octane fuel as is graphically shown in FIG. 2. Knock limited spark timing for a higher octane fuel and a lower octane fuel may be extrapolated based on knock limited spark timing of two blended fuels as is graphically shown in FIG. 3. FIG. 4 describes a method for determining knock limited spark timing for a fuel mixture based on linear estimates of knock limited spark timing for other fuels.

Figure 1:
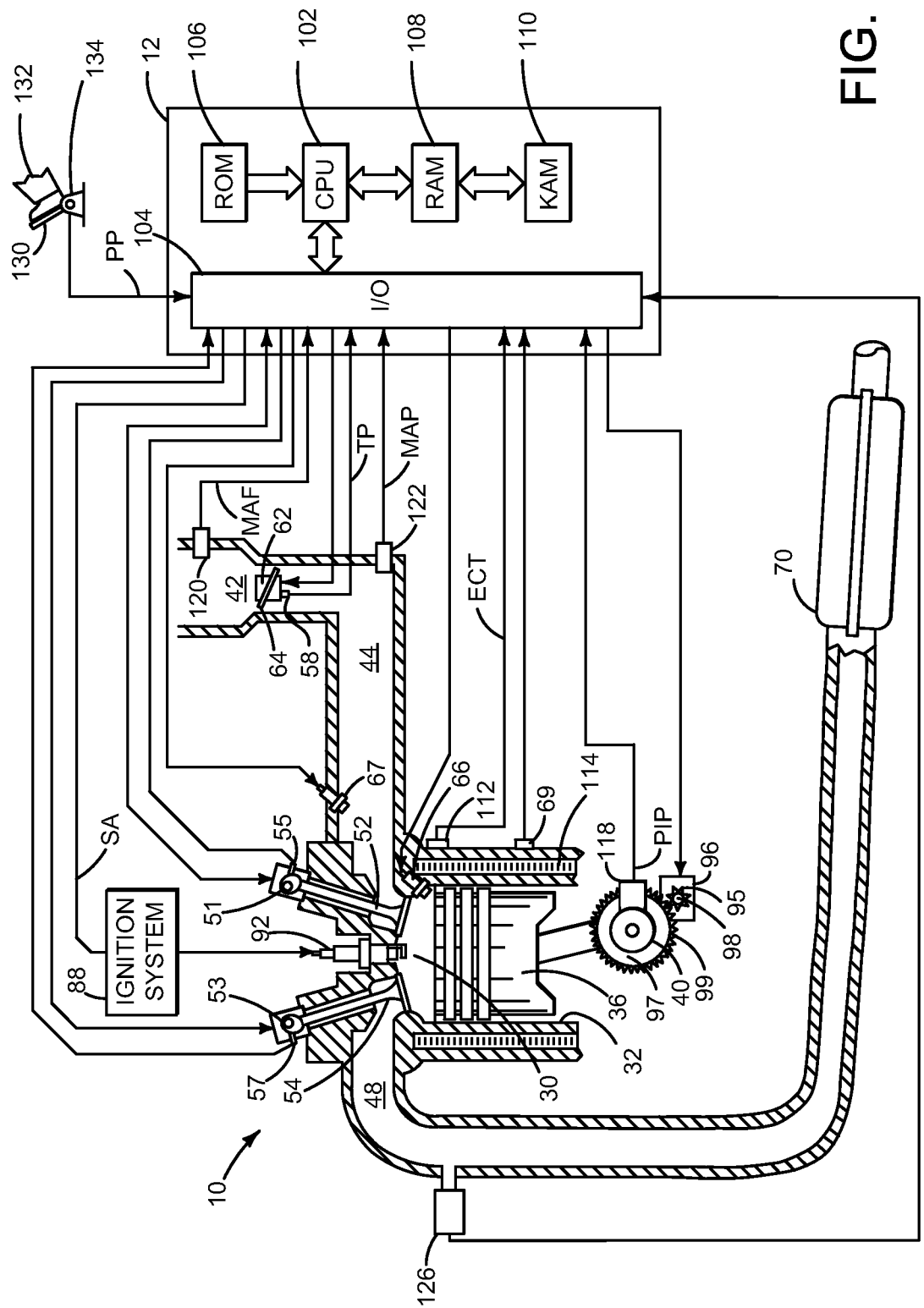
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, or in addition, fuel may be injected to an intake port via fuel injector 67, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). During a cylinder cycle, different amounts of fuel may be injected to combustion chamber 30 via injectors 66 and 67. Further, the type of fuel injected via fuel injector 66 may be different from the type of fuel injected via fuel injector 67. For example, fuel injector 66 may inject a fuel having a higher concentration of alcohol or natural gas than fuel injector 67. In an alternate example, cylinder 30 may be equipped with a single injector, and the type of fuel injected or ratio of fuels injected may be varied during operation via a valve in the fuel line or fuel rail, or by variable fuel pumps.

In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; knock sensor 69 for determining the presence or absence of engine knock; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Figure 2:
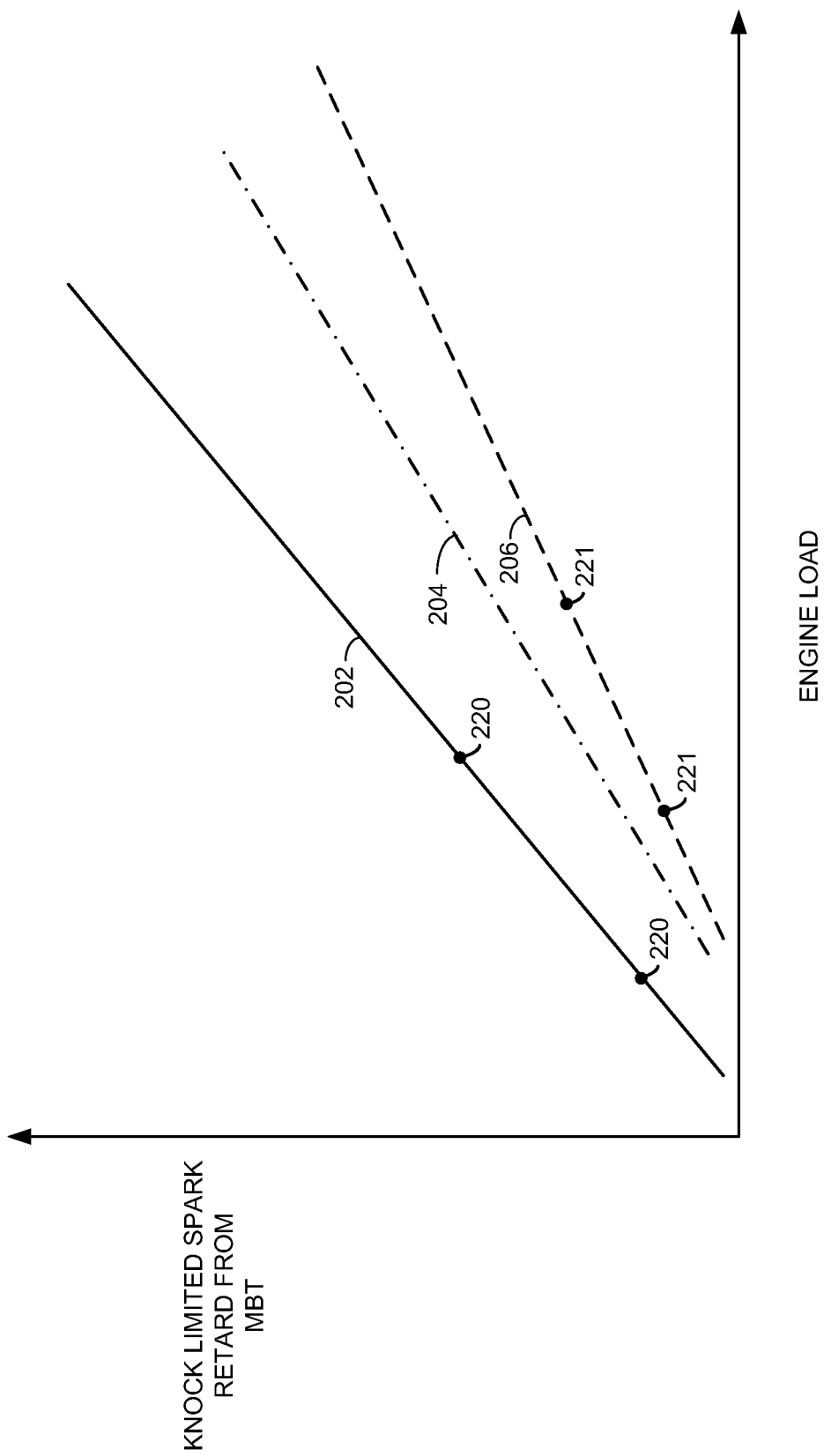
FIG. 2 shows a graphical example of interpolating knock limited spark timing based on knock limited spark timing of higher and lower octane fuels.

In some examples, the engine may be coupled to an electric motor/battery system in a hybrid vehicle as shown in FIG. 2.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The inventors herein have observed for a fuel, the knock limited combustion phasing (e.g., crankshaft angle where 50% of mass fraction burned for a combustion event) is a linear function of engine load. This relationship holds for low and high engine loads, except where fuel enrichment is present. Further, 50% mass fraction burn location may be an estimate of knock limited spark timing. The inventors estimate knock limited spark timing based on a linear relationship between engine load and knock limited spark retard from MBT. FIGS. 2 and 3 show two examples for estimating knock limited spark timing based on the linear relationship between engine load and knock limited spark retard from MBT.

Thus, the system of FIG. 1 provides for a vehicle system, comprising: an engine; first and second fuel injectors coupled to the engine, the first fuel injector supplying a first fuel to the engine, the second fuel injector supplying a second fuel to the engine, the first fuel different than the second fuel; and a controller including non-transitory instructions executable to adjust engine spark timing in response to an engine knock limited spark retard from MBT spark timing versus engine load relationship that is derived from two other engine knock limited spark retard from MBT spark timing versus engine load relationships. The vehicle system includes where the two other engine knock limited spark retard from MBT spark timing versus engine load relationships are expressed as straight lines. The vehicle system includes where the engine knock limited spark retard from MBT spark timing versus engine load relationship is expressed as a straight line. The vehicle system further comprises additional instructions for adjusting engine spark timing in response to engine knock. The vehicle system includes where the engine knock limited spark retard from MBT spark timing versus engine load relationship includes engine lower engine loads where knock is not present.

FIG. 2 is a plot showing a first way to interpolate knock limited spark timing for an engine that is combusting a mixture of two different fuels during an engine cycle. The plot includes an X axis that represents engine load (e.g., actual engine air amount divided by a theoretical engine air amount). Engine load may be expressed as a value between 0 and 1, where 1 represents full engine load and 0 represents zero air flow through the engine. Engine load increases in the direction of the X axis arrow. The Y axis represents knock limited spark timing retarded from minimum spark for best torque (MBT) spark timing. Engine spark timing is retarded further from MBT spark timing in the direction of the Y axis arrow.

Line 202 represents a relationship between knock limited spark retard from MBT spark timing and engine load for a low octane fuel. Line 206 represents a relationship between knock limited spark retard from MBT spark timing and engine load for a higher octane fuel. Line 204 represents a relationship between knock limited spark retard from MBT spark timing and engine load for a mixture of the higher and lower octane fuels.

In this example, the engine is operated with the higher octane fuel and engine knock is detected via an engine knock sensor at two engine loads and spark timings indicated by dots 221. The equation of line 206 is determined via the equation of a straight line (e.g., y=mx+b; where x is the x axis variable, y is the y axis variable, m is the slope, and b is the offset) and the point/slope formula (e.g., $$m = \frac{y_2 - y_1}{x_2 - x_1},$$

where $(x_1, y_1)$ is a first point on the line and where $(x_2, y_2)$ is a second point on the line) as described in more detail in the description of FIG. 4. Similarly, the equation of line 202 is determined based on two indications of engine knock at two engine loads and spark timings 220.

The equation for line 204 may be determined based on the ratio of the amount of higher octane fuel to lower octane fuel combusted in the engine and the equations of lines 202 and 206 as described in further detail in the description of FIG. 4. The slope of line 204 is derived from the slopes of lines 202 and 206. Similarly, the offset of line 204 is derived from the offsets of lines 202 and 206. If the engine is operated with a mixture of the higher and lower octane fuels, the knock limited spark retard from MBT spark timing for the mixed fuel may be determined by simply plugging in the present engine load into the equation that describes line 202. In this way, knock limited spark retard from MBT spark timing for a fuel mixture may be determined based on knock limited spark retards of the fuel mixture's component fuels. Consequently, spark timing tables for every conceivable ratio of fuels do not have to be empirically determined.

Referring now to FIG. 3, an alternate way of determining engine knock limited spark timing is graphically shown. Similar to FIG. 2, the plot includes an X axis that represents engine load (e.g., actual engine air amount divided by a theoretical engine air amount). Engine load may be expressed as a value between 0 and 1, where 1 represents full engine load and 0 represents zero air flow through the engine. Engine load increases in the direction of the X axis arrow. The Y axis represents knock limited spark timing retarded from minimum spark for best torque (MBT) spark timing. Engine spark timing is retarded further from MBT spark timing in the direction of the Y axis arrow.

Line 302 represents a relationship between knock limited spark retard from MBT spark timing and engine load for a low octane fuel. Line 308 represents a relationship between knock limited spark retard from MBT spark timing and engine load for a higher octane fuel. Lines 304 and 306 represent relationships between knock limited spark retard from MBT spark timing and engine load for a mixture of the higher and lower octane fuels. Line 304 represents knock limited spark retard from MBT spark timing for a fuel mixture that is comprised of a greater fraction of the lower octane fuel. Line 306 represents knock limited spark retard from MBT spark timing for a fuel mixture that is comprised of a greater fraction of the higher octane fuel.

In this example, the engine is operated with fuels that have the knock limited spark versus engine load relationships shown by lines 304 and 306. For the first fuel mixture represented by line 304, engine knock is detected via an engine knock sensor at two engine loads and spark timings indicated by dots 320. The equation of line 304 is determined via the equation of a straight line (e.g., y=mx+b; where x is the x axis variable, y is the y axis variable, m is the slope, and b is the offset) and the point/slope formula (e.g., $$m = \frac{y_2 - y_1}{x_2 - x_1},$$

where $(x_1, y_1)$ is a first point on the line and where $(x_2, y_2)$ is a second point on the line) as described in more detail in the description of FIG. 4. Similarly, the equation of line 306 is determined based on two indications of engine knock at two engine loads and spark timings 321.

The equation for line 302 may be determined based on the ratio of the amount of higher octane fuel to lower octane fuel combusted in the engine and the equations of lines 304 and 306 as described in further detail in the description of FIG. 4. The slope of line 302 is derived from the slopes of lines 304 and 306. Similarly, the offset of line 302 is derived from the offsets of lines 304 and 306. If the engine is operated with only the lower octane fuel, the knock limited spark retard from MBT spark timing may be determined by simply plugging in the present engine load into the equation that describes line 302. The equation of line 308 is determined in a similar way. Thus, based on the equation of two lines, an equation of a third line representing a pure fuel, or any desired ratio of fuels may be determined. In this way, knock limited spark retard from MBT spark timing for a fuel may be extrapolated from fuel mixtures that contain fractions of two fuels.

Referring now to FIG. 4, a method for determining engine spark timing is shown. The method of FIG. 4 may be stored as executable instructions in non-transitory memory of the system shown in FIG. 1.

At 402, method 400 judges whether or not the engine is a system that operates with a single type of fuel. The single type of fuel may be a mixture of two fuels that are supplied to the engine in a constant ratio (e.g. E10 (90% gasoline and 10% ethanol), E15 or E85), with no ability to change the mixture or type of fuel between refueling events. In contrast, a dual fuel system may use two fuels, and vary the relative amount of the two fuels as a function of engine operating conditions. For example, a higher ratio of low octane fuel (e.g. gasoline) may be used at lower loads, and a higher ratio of high octane fuel (e.g. E85 or CNG/LPG) may be used at higher loads. In one example, a variable in controller memory stores a value that is indicative of the type of fuel system. If method 400 judges that the engine is a single fuel system, the answer is yes and method 400 proceeds to 406. Otherwise, the answer is no and method 400 proceeds to 430.

At 406, method 400 judges whether or not knock limited spark retard from MBT spark timing as a function of engine load has already been determined for the type of fuel being supplied to the engine. If method 400 judges that the knock limited spark retard from MBT spark timing is known for the particular fuel supplied to the engine, the answer is yes and method 400 proceeds to 414. Otherwise, the answer is no and method 400 proceeds to 408.

At 408, method 400 determines knock limited spark timing at two different engine loads. In one example, method 400 may advance spark timing toward MBT spark timing at a first engine load until an indication of knock is produced via a knock sensor. Method 400 also advances spark timing toward MBT spark timing at a second engine load, the second engine load different than the first engine load, until an indication of knock is produced. Spark retard from MBT and engine load are stored to memory when engine knock is detected at the different engine loads. Method 400 may wait until the driver changes the driver demand torque before advancing spark timing so that engine speed and load do not change unexpectedly. In this way, knock limited spark timings may be determined in a way that is not intrusive. In some examples, method 400 may require a predetermined change in engine load from where the first knock limited spark timing is determined to the engine load where the second knock limited spark timing is determined. The spark timings recorded represent knock limited spark timing, and knock limited spark timing may be retarded from MBT spark timing. Method 400 proceeds to 410 after determination of knock limited spark timing commences.

At 410, method 400 judges whether or not knock limited spark retard from MBT spark timing has been determined at two different engine loads. If so, the answer is yes and method 400 proceeds to 412. Otherwise, the answer is no and method 400 returns to 408.

At 412, method 400 determines the equation of a line that describes knock limited spark retard from MBT spark timing as a function of engine load based on the engine loads and spark timings where knock occurred at 408. For example, if knock was produced at a first engine load of 0.4 and spark timing four degrees retarded from MBT spark timing, and if knock was produced at a second engine load of 0.8 and 8 degrees regarded from MBT spark timing, the slope is determined from the point/slope formula as $$\text{slope} = 10 = \frac{8-4}{0.8-0.4}.$$

The offset is zero as determined from b=4−(0.4)·10. In this way, the equation of a line representing knock limited spark timing based on engine load may be determined. Method 400 proceeds to 414 after the equation of the line is determined.

At 414, method 400 determines the present engine load. The present engine load may be determined via dividing the present engine air amount by the theoretical engine air amount (e.g., the amount of air the engine may theoretically induct). Method 400 proceeds to 416 after engine load is determined.

At 416, method 400 determines knock limited spark based on the present engine load and the equation of the line determined at 412. Thus, if the present engine load is 0.5, the knock limited spark timing is 5 degrees retarded from MBT spark timing. Method 400 proceeds to 418 after engine knock limited spark timing is determined.

At 418, method 400 adjusts engine knock limited spark timing for humidity and engine temperature. In one example, empirically determined adjustments for humidity and engine temperature are stored in tables or functions in controller memory. The present engine temperature and humidity index the table or function and an adjustment to knock limited spark timing is output and added to the knock limited spark timing determined at 416. Method 400 proceeds to 420 after the knock limited spark timing is adjusted for humidity and engine temperature.

At 420, method 400 delivers knock limited spark timing to the engine. In one example, knock limited spark timing is delivered to the engine via an ignition system including a spark plug. Method 400 proceeds to 422 after engine knock limited spark timing is output to the engine.

At 422, method 400 adjusts spark timing to engine knock. If engine knock is sensed via a knock sensor after knock limited spark is output to the engine, spark timing may be retarded in response to an indication of engine knock. Method 400 proceeds to exit after engine spark timing is adjusted.

At 430, method 400 determines the present ratio or fractions of fuel supplied to the engine. For example, if a cylinder fuel charge for a cylinder cycle is comprised of twenty five percent of a first fuel and seventy five percent of a second fuel, the first fuel fraction is twenty five percent and the second fuel fraction is seventy five percent. In one example, the fuel fractions are based on a total fuel mass entering the cylinder and the masses of each fuel that contribute to the total mass of fuel during a cylinder cycle. Further, the fuel mass and mass of each of the masses that are included in the total fuel mass may be determined via fuel injector transfer functions, fuel pressure, and the amount of time respective fuel injectors are open. Method 400 proceeds to 432 after the first and second fuel fractions or ratios are determined. In an alternate example, the fuel fractions may be determined or modified based on fuel volume, fuel heating value, or other fuel properties.

At 432, method 400 judges whether or not knock limited spark retard from MBT spark timing as a function of engine load is known for fuels provided to the engine at two different ratios. For example, if knock limited spark retard from MBT spark timing versus engine load is known for a ratio of twenty percent higher octane fuel to eighty percent lower octane fuel, and knock limited spark retard from MBT spark timing versus engine load is also known for a ratio of seventy percent higher octane fuel to thirty percent lower octane fuel, the answer is yes and method 400 proceeds to 436. Similarly, if knock limited spark retard from MBT spark timing versus engine load is known for any two fuel ratios which are sufficiently distinct from one another, the answer is yes and method 400 proceed to 436. In one example, two ratios of fuel are sufficiently distinct when the two different fuel ratios change the slope and/or intercept by a predetermined amount for the equation of the line representing engine knock limited spark retard from MBT spark timing as a function of engine load. Otherwise, the answer is no and method 400 proceeds to 434.

At 434, method 400 determines equations of lines that represent engine knock limited spark retard from MBT spark timing as a function of engine load. If the engine operates solely with each of a plurality of fuels (e.g., two different fuels) at selected operating conditions, method 400 determines equations for lines that represent engine knock limited spark timing when the engine is operated using one hundred percent of one of the fuels.

For example, if all fuel injected to a cylinder is a first type of fuel during selected conditions, an equation of a first line representing engine knock limited spark retard from MBT spark timing as a function of engine load is determined. The first line represents engine knock limited spark retard from MBT spark timing when the engine is operated with one hundred percent of a first fuel. The equation of the line is determined via operating the engine with one hundred percent of the first fuel at two different loads while spark is advanced until engine knock is sensed via a knock sensor. The engine load and spark timing are recorded for each of the two engine loads. The equation of the line representing engine knock limited spark retard from MBT spark timing as a function of engine load at one hundred percent of the first fuel is determined via the point/slope formula $$\left(e.g., m = \frac{y_2 - y_1}{x_2 - x_1}\right)$$

and the equation of a straight line (e.g., y=mx+b).

Method 400 also determines the equation of the line representing engine knock limited spark retard from MBT spark timing as a function of engine load when the engine is operated solely using the second fuel. The second line represents engine knock limited spark retard from MBT spark timing when the engine is operated with one hundred percent of a second fuel. The equation of the line is determined via operating the engine with one hundred percent of the second fuel at two different loads while spark is advanced until engine knock is sensed via a knock sensor. The engine load and spark retard are recorded for each of the two engine loads. The equation of the line representing engine knock limited spark retard from MBT spark timing as a function of engine load at one hundred percent of the second fuel is determined via the point/slope formula and the equation of a straight line. Lines 202 and 206 of FIG. 2 graphically illustrate lines that represent engine knock limited spark retard from MBT spark timing as a function of engine load for an engine that operates with one hundred percent of two different fuels at two different times. The equations of these two lines are the basis for interpolating equations of lines that represent fractional fuel ratios that lie between the zero and one hundred percent ratios (e.g., 45% of the first fuel and 55% of the second fuel).

On the other hand, if the engine does not operate with one hundred percent of each fuel at different times or if the engine has not operated using solely one fuel at one condition and solely the other fuel at another condition, method 400 determines equations of lines that represent knock limited spark retard from MBT spark timing as a function of engine load for fractional amounts of fuel provided to the engine. For example, a first line representing knock limited spark retard from MBT spark timing versus engine load for a fuel mixture delivered to a cylinder during a cylinder cycle comprised of 25% of a first fuel and 75% of a second fuel may be determined via recording spark retard and engine load where engine knock is detected via a knock sensor at two different engine loads. A second line representing knock limited spark retard from MBT spark timing versus engine load for a fuel mixture delivered to a cylinder during a cylinder cycle comprised of 40% of a first fuel and 60% of a second fuel may be determined via recording spark retard and engine load where engine knock is detected via a knock sensor at two different engine loads. The equations of the two lines are determined via the point/slope equation and the equation of a straight line. Lines 304 and 306 of FIG. 3 graphically illustrate lines that represent engine knock limited spark retard from MBT spark timing as a function of engine load for an engine that operates with fractional amounts or different percentages of two different fuels at two different times. The equations of these two lines are the basis for interpolating or extrapolating to lines that represent different concentrations of fuel supplied to the engine (e.g., 0% first fuel and 100% second fuel). Method 400 proceeds to 436 after the equations of two lines representing knock limited spark retard from MBT spark timing versus engine load at two different fuel ratios are determined.

At 436, method 400 determines the present engine load. The present engine load may be determined via output of an engine air meter or a pressure sensor. In one example, engine load is expressed as the present engine air amount divided by the theoretical maximum engine air amount. Method 400 proceeds to 438 after the engine load is determined.

At 438, method 400 determines knock limited spark timing based on engine load. If the equation of a line describing engine knock limited spark retard from MBT spark timing versus engine load for the present fuel mixture delivered to the engine is known, engine load from 436 is used as input to the equation of a straight line representing engine knock limited spark timing versus engine load. The equation outputs engine knock limited spark based on the present engine load.

If an equation of a line representing engine knock limited spark retard from MBT spark timing versus engine load is not known, an equation of a line representing engine knock limited spark retard from MBT spark timing versus engine load is determined from the equations of lines determined at 434. The equation of the known line may be interpolated or extrapolated from the equations determined at 434.

An equation of an interpolated line may be determined according to the following example. If equations of lines associated with two fuel fractions comprised of zero percent of a first fuel and one hundred percent of a second fuel, and one hundred percent of the first fuel and zero percent of the second fuel are known, an equation of a line is interpolated from the equations of the two known lines representing engine knock limited spark retard from MBT spark timing versus engine load. For example, an equation of a first line (100% first fuel and 0% second fuel) is determined based on engine knock at 0.3 engine load, 5 degrees spark retard from MBT timing and engine knock at 0.1 engine load, 0.5 degrees spark retard from MBT timing. The first equation slope is $$m = \frac{5 - 0.5}{0.3 - 0.1} = 22.5$$

and the offset is 5−22.5(0.3)=b=−1.75. An equation of a second line (0% first fuel and 100% second fuel) is determined based on engine knock at 0.5 engine load, 1.5 degrees spark retard from MBT timing and engine knock at 0.2 engine load, 0.25 degrees spark timing from MBT timing. The second equation slope is $$m = \frac{1.5 - 0.25}{0.5 - 0.2} = 4.17$$

and the offset is 1.5−4.17(0.5)=b=−0.585.

An equation of a third line representing thirty percent of the first fuel and seventy percent of the second fuel may be interpolated from the two equations. In particular, the slope of the third line is (22.5·0.3)+(4.17·0.7)=9.669 and the offset is (−1.75·0.3)+(−0.585·0.7)=−0.9345. Thus, the slope for the third line is the slope of the first line multiplied by the fraction of the first fuel plus the slope of the second line multiplied by the fraction of the second fuel. Likewise, the offset for the third line is the offset of the first line multiplied by the fraction of the first fuel plus the offset of the second line multiplied by the fraction of the second fuel.

On the other hand, if the equation of the first line represents an equation of a line for knock limited spark retard from MBT spark timing for a fuel mixture supplied to the engine that is seventy five percent of the first fuel and twenty five percent of the second fuel, and the equation for the second line represents an equation of a line for knock limited spark timing for a fuel mixture supplied to the engine that is twenty percent of the first fuel and eighty percent of the second fuel, the equations of the lines for knock limited spark timing for a fuel comprised of one hundred percent of either fuel is found by solving for the two slopes and the two intercepts according to the following four equations that are based on the slopes and offsets or intercepts of the first and second lines.

$$22.5 = 0.75 \cdot m_1 + 0.25 \cdot m_2$$

$$4.17 = 0.20 \cdot m_1 + 0.80 \cdot m_2$$

$$-1.75 = 0.75 \cdot b_1 + 0.25 \cdot b_2$$

$$-0.5855 = 0.20 \cdot b_1 + 0.80 \cdot b_2$$

The slopes $m_1$ and $m_2$ as well as intercepts $b_1$ and $b_2$ may be solved algebraically based on two equations and two unknowns. The slope $m_1$ which represents the slope of the equation representing engine knock limited spark retard from MBT spark timing versus engine load when one hundred percent of the first fuel is supplied to the engine is solved to be 30.83=100·0.3083. The slope $m_2$ which represents the slope of the equation representing engine knock limited spark retard from MBT spark timing versus engine load when one hundred percent of the second fuel is supplied to the engine is solved to be −2.495=100·−0.2495.

The offset or intercept $b_1$ which represents the intercept of the equation representing engine knock limited spark retard from MBT spark timing versus engine load when one hundred percent of the first fuel is supplied to the engine is solved to be −2.28=100·−0.228. The offset or intercept $b_2$ which represents the intercept of the equation representing engine knock limited spark retard from MBT spark timing versus engine load when one hundred percent of the second fuel is supplied to the engine is solved to be −0.16=100·−0.0016.

Once the equation of the line representing engine knock limited spark retard from MBT spark timing versus engine load for the ratio of the first and second fuels provided to the engine at the present time is known, the present engine load is input into the equation of the line and the knock limited spark retard from MBT spark timing at the present engine load is determined. Method 400 proceeds to 418 after engine knock limited spark retard from MBT spark timing is determined.

In this way, the slope and offset values of lines representing engine knock limited spark retard from MBT spark timing versus engine load may be determined by interpolating or extrapolating slope and offset terms from two known lines that represent engine knock limited spark retard from MBT spark timing versus engine load.

Thus, the method of FIG. 4 provides for a method for adjusting engine spark timing, comprising: adjusting engine spark timing in response to an engine knock limited spark retard from MBT spark timing interpolated or extrapolated from a plurality of engine knock limited spark retard from MBT spark timing versus engine load relationships. The method further comprises determining a first equation of a first line representing engine knock limited spark retard from MBT spark timing in response to presence of engine knock at two different engine loads, using a first fuel or fuel ratio. The method further comprises determining a second equation of a second line representing engine knock limited spark retard from MBT spark timing in response to presence of engine knock at two different engine loads, using a second fuel or fuel ratio. The method includes where the engine knock limited spark retard from MBT spark timing is interpolated from the first and second equations when the current fuel ratio is between the first and second fuel ratios. The method further includes extrapolating from the first and second equations when the current fuel ratio is outside the range of the first and second fuel ratios.

In some examples, the method includes where the first and second equations are equations of straight lines. The method includes where the engine knock limited spark retard from MBT spark timing interpolated from the plurality of engine knock limited spark retard from MBT spark timing versus engine load relationships is expressed as an equation of a straight line. The method includes where the equation of the straight line is based on interpolating a slope from two other slope values. The method includes where the equation of the straight line is based on interpolating an offset from two other offset values.

The method of FIG. 4 also provides for a method for adjusting engine spark timing, comprising: adjusting engine spark timing in response to an engine knock limited spark retard from MBT spark timing extrapolated from a plurality of engine knock limited spark retard from MBT spark timing versus engine load relationships. The method includes where the engine knock limited spark retard from MBT spark timing extrapolated from the plurality of engine knock limited spark retard from MBT spark timing versus engine load relationships is based on equations of two lines. The method includes where the equations of two lines are based on operating an engine at a first ratio of a first fuel to a second fuel, and operating the engine at a second ratio of the first fuel to the second fuel, the first ratio different from the second ratio.

In some examples, the method includes where the engine knock limited spark retard from MBT spark timing extrapolated from the plurality of engine knock limited spark retard from MBT spark timing values is determined in response to engine knock at a plurality of engine loads. The method further comprises adjusting the engine spark timing in response to an indication of engine knock. The method includes where adjusting engine spark timing in response to engine knock limited spark retard from MBT spark timing includes extrapolating a slope of an equation of a line representing engine knock limited spark retard from MBT spark timing versus engine load. The method includes where adjusting engine spark timing in response to engine knock limited spark retard from MBT spark timing includes extrapolating an offset of an equation of a line representing engine knock limited spark retard from MBT spark timing versus engine load.

As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, or alternative fuel configurations could use the present description to advantage.

The invention claimed is:

1. A method for adjusting engine spark timing, comprising:
    adjusting engine spark timing in response to an engine knock limited spark retard interpolated from a plurality of straight lines representing engine knock limited spark retard versus engine load relationships, the plurality of straight lines representing engine knock limited spark retard versus engine load relationships based on a plurality of mixtures of high and low octane fuels.

2. The method of claim 1, further comprising determining a first equation of a first line representing engine knock limited spark retard in response to presence of engine knock at two different engine loads for an engine using a first fuel or fuel ratio.

3. The method of claim 2, further comprising determining a second equation of a second line representing engine knock limited spark retard in response to presence of engine knock at two different engine loads for the engine using a second fuel or fuel ratio.

4. The method of claim 3, where the engine knock limited spark retard is interpolated from the first and second equations.

5. The method of claim 4, where the first and second equations are equations of straight lines.

6. The method of claim 5, where the engine knock limited spark retard interpolated from the plurality of straight lines representing engine knock limited spark retard versus engine load relationships is expressed as an equation of a straight line.

7. The method of claim 6, where the equation of the straight line is based on interpolating a slope from two other slope values.

8. The method of claim 7, where the equation of the straight line is based on interpolating an offset from two other offset values.

9. A method for adjusting engine spark timing, comprising:
    adjusting engine spark timing in response to an engine knock limited spark retard extrapolated from a plurality of straight lines representing engine knock limited spark retard versus engine load relationships, the plurality of straight lines representing engine knock limited spark retard versus engine load relationships based on a plurality of mixtures of high and low octane fuels.

10. The method of claim 9, where the engine knock limited spark retard extrapolated from the plurality of straight lines representing engine knock limited spark retard versus engine load relationships is based on equations of two lines, where the engine knock limited spark retard is based on a ratio of an amount of higher octane fuel to lower octane fuel combusted in an engine and the equations of the two lines.

11. The method of claim 10, where the equations of the two lines are based on operating the engine at a first ratio of a first fuel to a second fuel, and operating the engine at a second ratio of the first fuel to the second fuel, the first ratio different from the second ratio.

12. The method of claim 9, where the engine knock limited spark retard extrapolated from the plurality of straight lines representing engine knock limited spark retard versus engine load relationships is determined in response to engine knock at a plurality of engine loads.

13. The method of claim 9, further comprising adjusting the engine spark timing in response to an indication of engine knock.

14. The method of claim 9, where adjusting engine spark timing in response to engine knock limited spark retard includes extrapolating a slope of an equation of a line representing engine knock limited spark retard versus engine load.

15. The method of claim 9, where adjusting engine spark timing in response to engine knock limited spark retard includes extrapolating an offset of an equation of a line representing engine knock limited spark retard versus engine load.

* * * * *